United States Patent [19]

Howard et al.

[11] Patent Number: 5,080,631
[45] Date of Patent: Jan. 14, 1992

[54] METHOD AND APPARATUS OF CUTTING THE SECOND JOINT OF A POULTRY WING AND PRODUCT THEREFROM

[75] Inventors: Jasper N. Howard, Cedartown, Ga.; Benedict DiGerlando, Cedar Bluff, Ala.; George M. Hopkins, Atlanta, Ga.

[73] Assignee: James Edwin Mauer, Cedartown, Ga.

[21] Appl. No.: 532,935

[22] Filed: Jun. 4, 1990

[51] Int. Cl.$^5$ ............................................. A22C 21/00
[52] U.S. Cl. ....................................... 452/166; 452/169; 452/154
[58] Field of Search ............... 452/166, 169, 170, 177, 452/154, 155; 83/167, 409.2, 435, 432, 669, 531, 532, 684

[56] References Cited

U.S. PATENT DOCUMENTS

| | | | |
|---|---|---|---|
| 3,082,475 | 3/1963 | Belknap | 452/174 |
| 4,074,389 | 2/1978 | Blair | 452/174 |
| 4,563,791 | 1/1986 | Martin et al. | 452/169 |
| 4,811,457 | 3/1989 | Lindert | 452/136 |
| 4,815,166 | 3/1989 | Martin et al. | 452/134 |
| 4,930,187 | 6/1990 | Whittington | 452/170 |

Primary Examiner—Willis Little
Attorney, Agent, or Firm—Hopkins & Thomas

[57] ABSTRACT

A conveyor with juxtaposed blocks moves along a path of travel, certain of the blocks have recesses which receive second joints of the wings of poultry. The second joints are arranged sidewise to the path of travel of the conveyor, in the recesses and are successively passed beneath a support frame where a knife is reciprocated as the support frame is towed by the conveyor to cut the flesh and skin between the ulna and radius bones and one or both cartilages, which join the ends of the bones. When cutting a cartilage, the bones are urged apart as the cut is made. When one cartilage, only is cut, the bones are pivoted to produce a V-shaped product. This V-shaped product is coated with an edible coating and cooked of frozen for shipment. Several types of blades are illustrated, the blades having one or more camming surfaces for urging the bones apart.

37 Claims, 9 Drawing Sheets

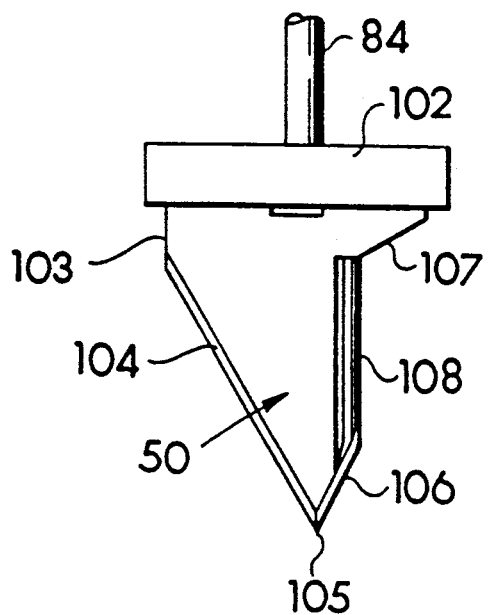 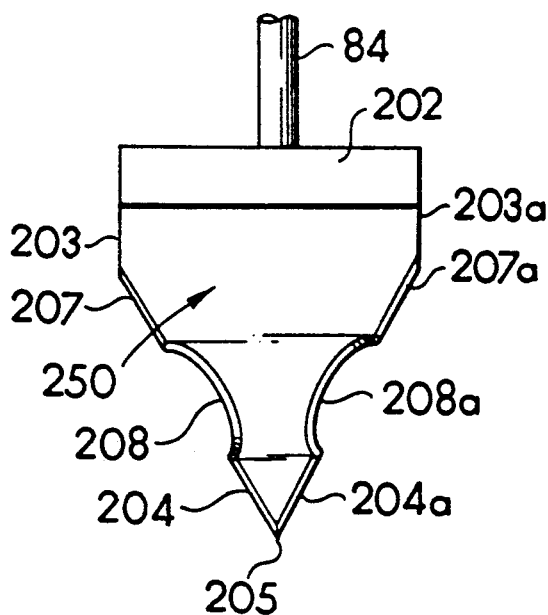
FIG 7  FIG 8
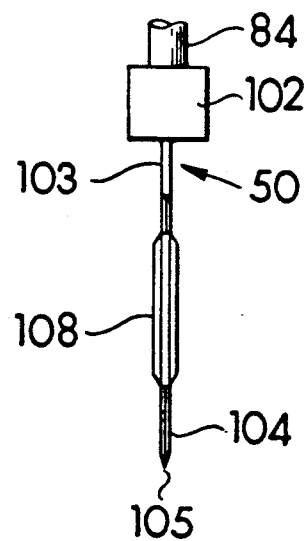
FIG 9

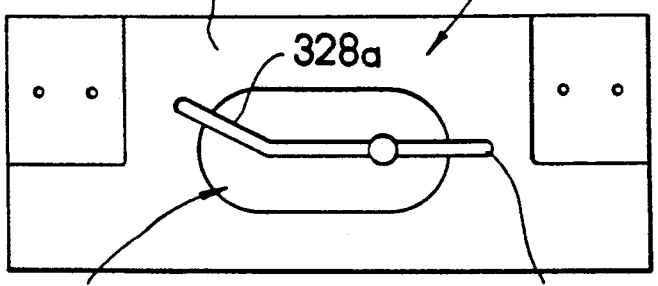
FIG 17
FIG 18
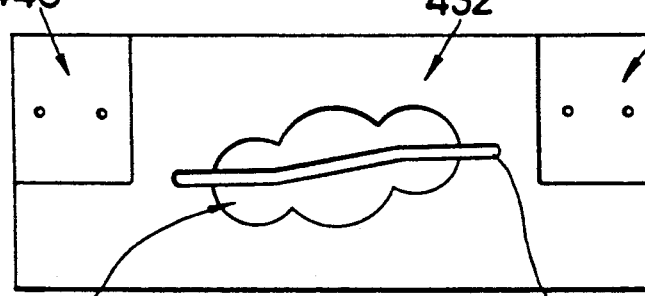
FIG 19
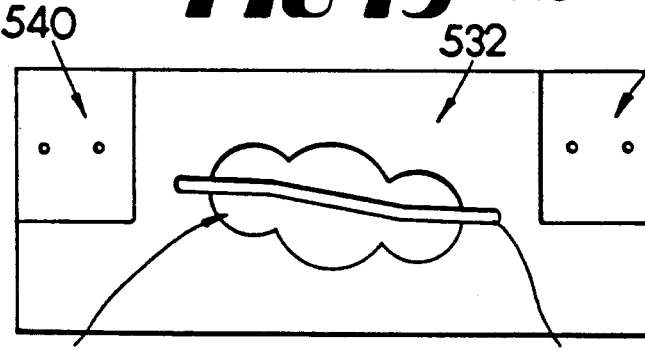
FIG 20

METHOD AND APPARATUS OF CUTTING THE SECOND JOINT OF A POULTRY WING AND PRODUCT THEREFROM

BACKGROUND OF THE INVENTION

This invention relates to a method and apparatus of parting the second joints of poultry wings and is more particularly concerned with a method and apparatus of slicing the second joint longitudinally so as to cut one or both of the cartilages which connect the two bones of the second joint together.

In the past, the second joint of the wing of a fowl has been sliced longitudinally so as to separate this second joint into two separate parts. Recently, a machine has been developed for semiautomatically severing the second joint so as to separate it into two pieces, this device including a pair of rotatable discs having opposed inwardly opening recesses, each pair of which receives a second joint of the wing. These two discs are separated by a central spacer plate to provide a circumferential space between the discs, for receiving a stationary knife which is engaged by each wing, as the discs move the second joints in a rotary or orbital path. There is also a cam for automatically ejecting the cut pieces of second joint after such pieces have been severed.

The structure described above, while being capable of severing both of the cartilages which join the ulna and radius bones of the wing together, is slow in operation and requires dexterity on the part of the operator so as to insert the successive second joints into successive opposed Pairs of slots as the discs are rotated. The present invention provides a much more versatile and easily operated machine which is faster and does a superior job of cutting either one or both cartilages of the second joint.

SUMMARY OF THE INVENTION

Briefly described, the present invention, which lends itself well to the processing of the second joints of wings of Poultry, includes a continuous conveyor which has successive transversely mounted blocks on the outer portion of the conveyor. In one embodiment, each second, third or fourth block is a transportation block provided with an outwardly opening object (second joint) receiving recess or cavity and a transversely disposed knife recess. The operator stands adjacent to the down stream end of the machine and successively places wing joints into the recesses at the up stream end of the upper flight of the conveyor. These second joints are manually positioned transversely of the direction of travel of upper flight of the conveyor and are progressively carried down stream to a cutting zone beneath the cutter assembly.

The cutter assembly is disposed in spaced relationship over the cutting zone in the path of travel of the blocks on the upper flight of the conveyor and has a transverse central wedge-shaped knife which is reciprocated vertically for severing the second joint or other article disposed therebeneath on the transportation block. The knife or guillotine is reciprocated by a central pneumatic cylinder.

Disposed on opposite sides of the central pneumatic cylinder are a pair of finger extending Pneumatic cylinders which respectively carry fingers which can be extended and retracted by the pistons of the cylinders. When the fingers are extended, they project into side slots or cavities of a transportation block and eventually are engaged by the shoulders which define those cavities. Each transportation block is suitably supported by its end portions on the chains of the conveyor for travelling sidewise along the upper flight of the conveyor. Thus, when the fingers are extended and are engaged by the shoulders of the block, not only is the cutting assembly moved rearwardly (down stream) by the conveyor, at the rate of travel of the conveyor, but the fingers and shoulders automatically align the knife or guillotine with the object to be cut. Thus, after the fingers engage the shoulders, and the cutting assembly is traveling rearwardly with the conveyor, the central air cylinder is actuated to cause the blade to cut down through the object (second joint) carried by the block. When such object is a second joint, the blade or guillotine will initially enter the central portion of the second joint, between the two transversely disposed ulna and radius bones and then cut outwardly so as to sever that portion of the meat between the bones and the one cartilage which join the two bones. The knife or guillotine has a spine or rounded portion which urges the two parts of the second joint apart, pivoting them about the remaining connecting cartilage.

After the momentary reciprocation of the knife or guillotine by the central air cylinder, the side air cylinders retract the fingers so that the cutting assembly is released from its alignment with a particular transportation block. Spring means return the cutting assembly up stream to its original Position where the cycle is repeated for the next subsequent transportation block. The partially severed second joints are then successively dumped from the down stream end of the conveyor, as the transportation blocks move to the lower flight of the conveyor. The sequence of events is controlled by an air stepping relay and the conveyor is driven by an air motor. The front end of the conveyor and the cutting assembly are covered to protect the operator and a water spray is directed against successive blocks as they pass from the lower flight to the upper flight for washing any debris therefrom.

In the process carried out, successive spaced transversely disposed second joints are moved along a linear path of travel and are successively cut in a moving cutting zone by the reciprocating blade and thereafter are discharged from the path of travel.

Each second joint is disposed transversely of the path of travel and the blade of the cutting mechanism is also disposed transversely of the path of travel. Furthermore, the knife or cutting element which cuts the second joint, progressively moves the two bones of the second joint apart as or after the cut progresses so as to bias the bones as the cut is made and then urge them to an open V-shape if only one cartilage is cut. The knife initially enters each second joint intermediate the ends of the second joint and between the two bones and then cuts progressively outwardly for severing one of the end cartilages.

In a second embodiment, the knife or guillotine is V-shaped and simultaneously cuts the second joint outwardly in both directions so as to sever both cartilages of the second joint.

In the third and fourth embodiments, the knives are bent along the axes of travel to provide camming surfaces which urge the bones apart and cutting edges which cut at angles through the cartilage.

Accordingly, it is an object of the present invention to provide an apparatus and method of cutting a second joint of a wing of a fowl so as to leave the second joint with only one cartilage connecting the two bones together and so as to arrange the two parts of the second joint in a V-shape.

Another object of the present invention is to provide a semiautomatic apparatus for cutting the second joints of poultry which apparatus is inexpensive to manufacture, durable in structure and efficient in operation.

Another object of the present invention is to provide an apparatus and method of cutting a second joint of poultry so as to separate the second joint into two separate parts, without excessive manual labor.

Another object of the present invention is to provide a method and apparatus for severing a second joint of poultry which method is clean and provides a uniform product.

Another object of the present invention is to provide an apparatus for cutting the second joints of poultry wings which apparatus may effectively perform its cutting operation, regardless of the size of the second joint and will reduce the likelihood that the ulna and radius bones will be cut in the operation.

Another object of the present invention is to provide a novel V-shaped poultry product from the second joint of a chicken or other fowl.

Other objects, features and advantages of the present invention will become apparent from the following description when taken in conjunction with the accompanying drawings wherein like characters of reference designate corresponding parts throughout the several views.

DESCRIPTION OF THE DRAWINGS

FIG. 7 is a fragmentary front elevational view showing the knife of the machine of FIG. 1, supported by a portion of the piston rod of that machine, the knife being capable of severing a single cartilage and spreading the ulna and radius apart to produce the product shown in FIG. 6;

FIG. 8 is a view similar to FIG. 7 but showing a second configuration of a knife, the knife being suitable for cutting the second joint into two separate parts;

FIG. 9 is a side elevational view of that portion of that structure shown in FIG. 7;

FIG. 17 is a plan view of a modified transportation block for cooperating with the knife of FIG. 13;

FIG. 18 is a plan view of a modified transportation block for cooperating with the knife of FIG. 14;

FIG. 19 is a plan view of a modified transportation block for cooperating with the knife of FIG. 15; and FIG. 20 is a plan view of a modified form of transportation block for cooperating with the knife of FIG. 16.

DETAILED DESCRIPTION

Figure 1:
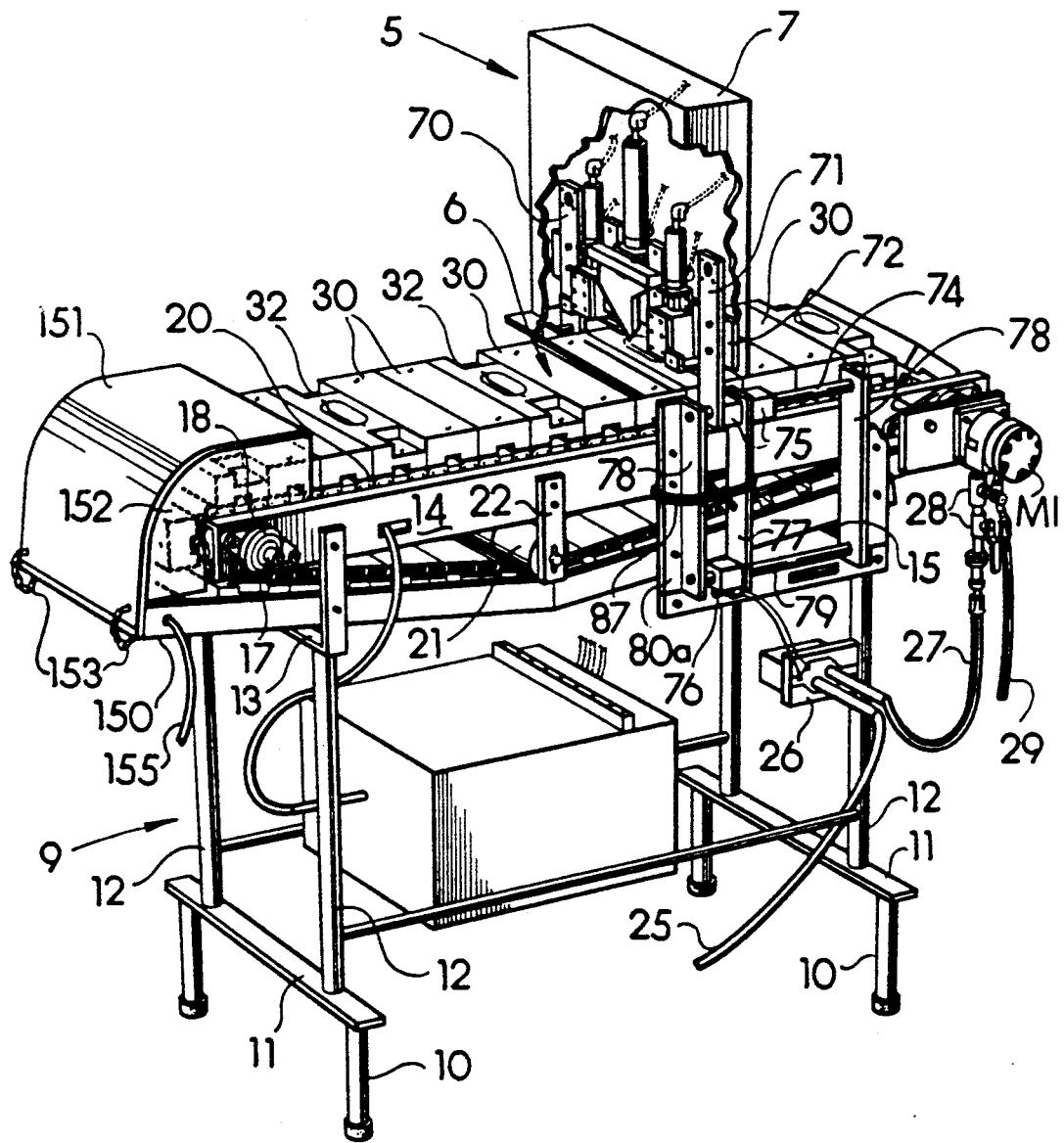
FIG. 1 is a fragmentary perspective view of an apparatus for cutting the second joints of poultry wings, made according to the present invention.

Referring now in detail to the embodiment chosen for the purpose of illustrating the present invention, numeral 9 in FIG. 1 denotes generally the main frame of the apparatus of the present invention, this frame 9 including four upstanding spaced parallel feet 10, the upper ends of pairs of which are joined by transverse bars 11. An upstanding pair of front stanchions 12 is carried by the front bar 11 and support an inverted, U-shaped, transverse, front bracket 13 which, in turn, supports front end portions of longitudinally extending, transversely spaced, parallel, opposed conveyor support rails, such as rail 14. A rear U-shaped bracket 15, on rear stanchions 12 carried by the rear bar 11, provides support for the rear portion of the rails, such as rail 14.

A conveyor assembly 6 is supported on rails 14, conveyor 6 includes a front transversely extending idler conveyor shaft 17 supported between the front end portions of the rails such as rail 14. This idler shaft 17 is appropriately journalled by pillow blocks, such as block 18. A drive shaft (not shown), driven by an air motor M1, in FIG. 1, is journalled at the rear portions of the opposed rails, such as rail 14. Sprockets (not shown) on the spaced shafts, such as shaft 17, support a pair of transversely spaced, opposed, parallel, longitudinally extending continuous conveyor chains, such as chain 20, the continuous chains, being draped around sprockets (not shown) of the shaft which is driven by motor M1.

Transversely extending take-up roll 21 carried by brackets, such as downwardly extending bracket 22, on rail 14 maintains appropriate tautness of the two opposed continuous conveyor chains, such as conveyor chain 20.

The air motor M1 is rotated by compressed air fed from tube 25, via solenoid valve 26, and thence through tube 27 and manual cut-off valves 28 and into motor M1. The discharge line 29 discharges the discharged air from motor M1.

Figure 4:
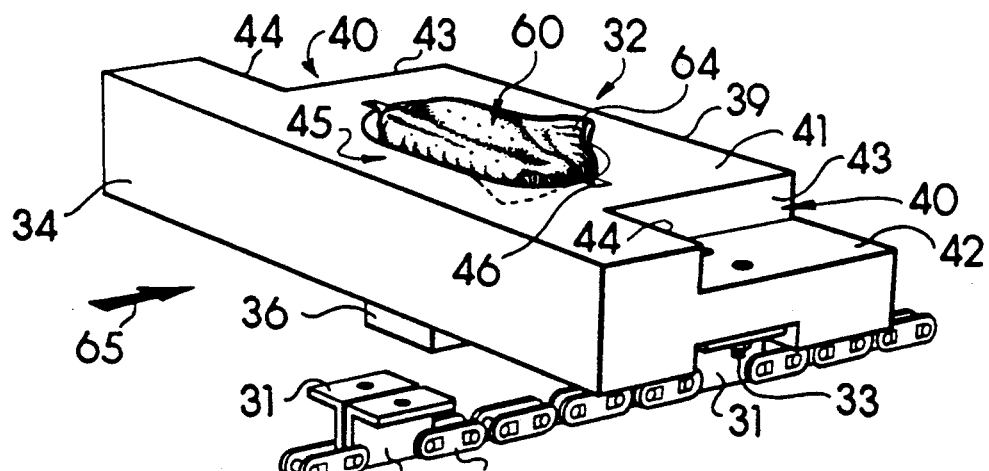
FIG. 4 is an enlarged perspective view showing a portion of the chain of the conveyor and a transportation block of the conveyor of the machine of FIG. 1, the transportation block containing a second joint of a wing of a fowl.

Mounted in juxtaposition are a plurality of rectangular spacer blocks 30, each of which is arranged transversely across two conveyor chains 20, the spacer blocks 30 being secured by their bottom portions to the chain by means of opposed pairs of upstanding L-shaped chain brackets 31, seen in FIG. 4. A pair of these brackets 31 back-to-back form a link in the conveyor chain 20.

Figure 10:
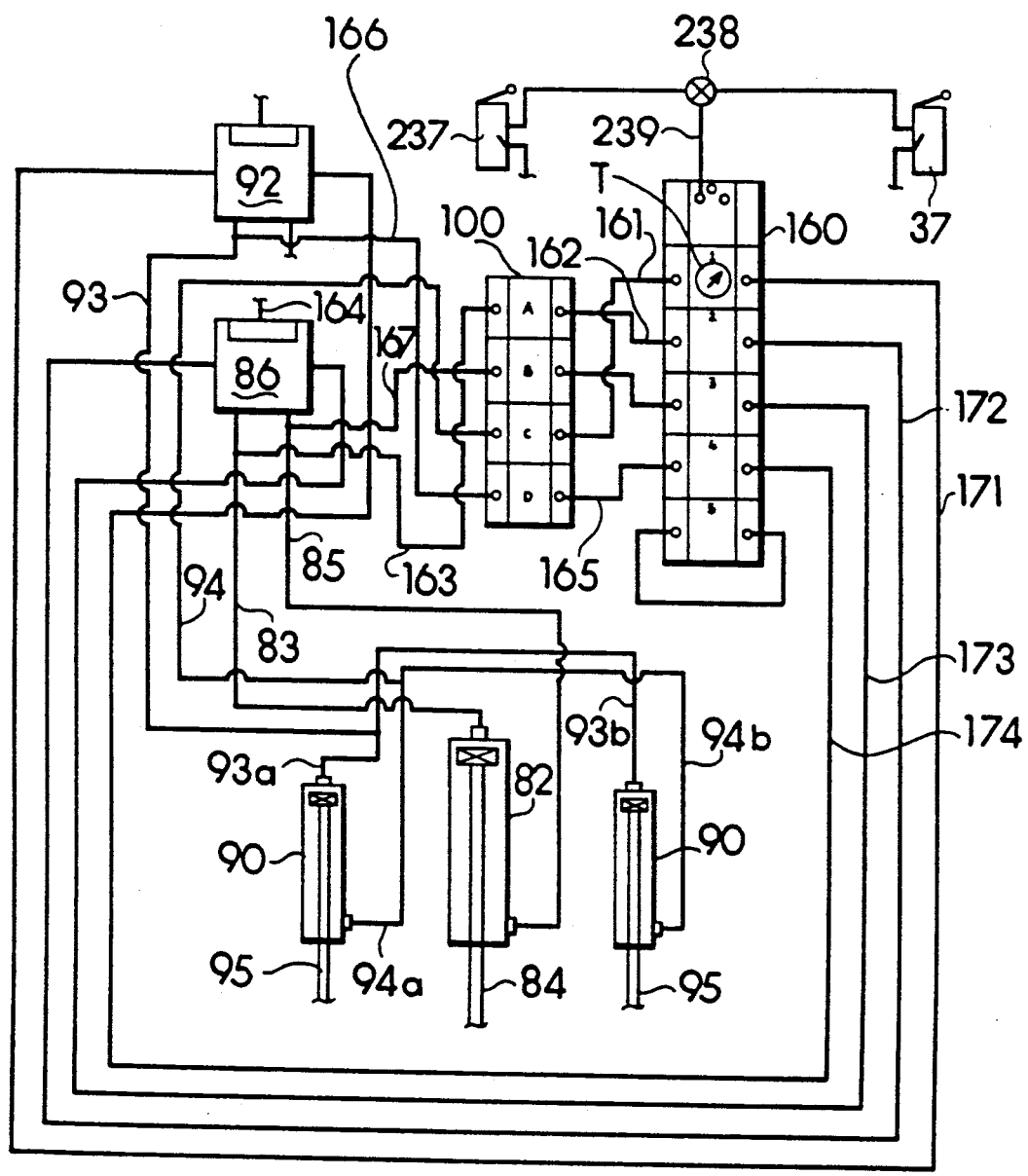
FIG. 10 is a schematic diagram showing the pneumatic system for the machine of the present invention.

Between successive pairs of spacer blocks 30 are the transportation blocks 32. Each block 32 has generally a rectangular shape of the same dimensions as the spacer block 30. This block 32 is also mounted by brackets, such as bracket 31, which forms a link in the chain 20, the space between successive brackets 31 being approximately equal to the longitudinal width of the spacer block 30 or block 32. Bolts, such as bolt 33, seen in FIG. 4, secure the transportation block 32 onto pairs of transversely opposed brackets, such as bracket 31 on chains, such as chain 20. The transportation block 32 extends transversely across the pair of chain conveyors, such as conveyor chain 20, and are in longitudinal alignment with the spacer blocks 30, the rear wall 34, of the transportation block 32 being closely adjacent to the front wall of the adjacent spacer blocks 30 when the blocks 30 and 32 are passed along the upper flight of the conveyor. In the central bottom portion of each transportation block 32 is a downwardly protruding cam or cam block 36, seen in FIG. 4. This cam block 36 actuates a control means, such as a pneumatic control valve 37, seen in FIG. 10 and commences one cycle of the machine, as will be described hereinafter.

At the opposed rear corners of each rectangular block 32 there are provided a pair of finger receiving recesses 40 which are formed in the upper surface 41 of the block 32. These recesses 40 are generally rectangular so as to provide upper recess surfaces, such as surface 42, in FIG. 4 and vertical side surfaces 43 which are parallel to each other and are disposed longitudinally with respect to the machine. The recesses 40 are also defined by recess shoulders or walls 44 which have vertical surfaces which are transversely aligned with each other and are spaced rearwardly in the path of travel of the front surface 39 of block 32.

Figure 5:
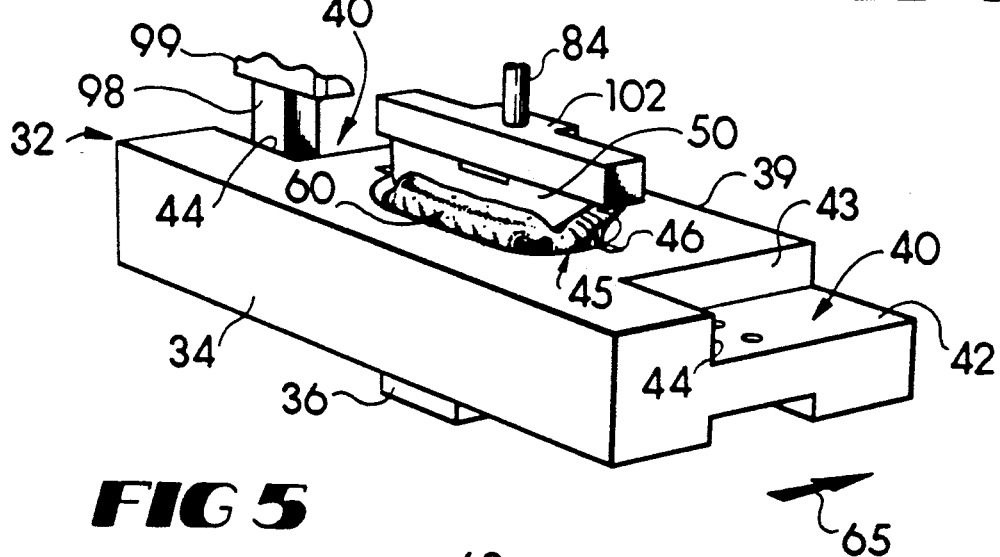
FIG. 5 is a fragmentary perspective view of the transportation block shown in FIG. 4 and illustrating the knife or guillotine in its extended position and one of the fingers in its extended position.

Inwardly of the walls or surfaces 43 of each transportation block 32 is a central, upwardly open, object receiving, recess or cavity, denoted generally by the numeral 45. This recess or cavity 45 is an upwardly open, oval shaped opening which is elongated transversely of the block 32. Cavity 45 has concaved wall surfaces extending downwardly and thence is curved inwardly to form a central cup. Extending in a transverse direction across the cavity 45 and protruding beyond the cavity 45 on both of its sides is a is transverse central, vertically disposed, knife receiving slot 46 which conforms generally to the cross sectional maximum width of the the knife or guillotine 50, the transverse knife receiving slot 46 having a depth sufficient to permit full travel of the guillotine 50 downwardly to its most extended position as shown in FIG. 5. Each recess or cavity 45 is of a length greater than the length of the second joint 60 of a wing of a chicken or other fowl.

Figure 6:
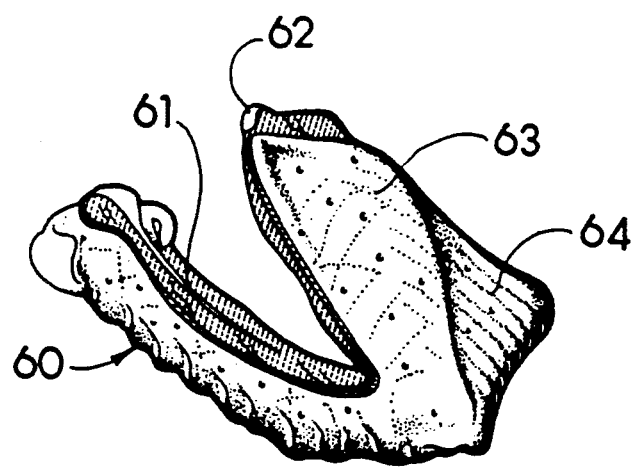
FIG. 6 is a schematic perspective view of one of the second joints of a fowl after the cutting thereof by the reciprocation of the knife.

The term "second joint" means the part of a chicken or other fowl between a drumette of a wing of a chicken or other fowl and the flipper thereof. This second joint 60 has previously been severed from both the drumette and the flipper. Each second joint 60 has an ulna bone 61 and a radius bone 62, shown in FIG. 6, are transversely spaced from each other and which extend essentially parallel to each other within the second joint. The end portions of the ulna and radius bones 61 and 62 are joined by cartilages, such as the cartilage, between the ends of bones 61 and 62. Flesh and skin initially surround these two bones 61 and 62 and the connecting cartilages, the skin being identified by numeral 63 and the flesh by numeral 65, in FIG. 6. Each second joint 60 also includes a web portion 64 which is essentially skin which protrudes from a corner of the second joint 60.

In the present embodiment, the second joint 60, which it is to be cut, is preferably positioned in cavity or recess 45 with the web 64 in the right hand forward corner of the recess 45. The depth of the recess 45, however, is less than the thickness of the second joint 60 and yet will orient the second joint 60 and hold it in its transverse position within the cavity 45, as illustrated in FIG. 4. The depth of cavity 45 is sufficient to arrest any appreciable forward or rearward movement of the second joint 60 during its transportation in block 32 along the upper flight of the conveyor. The direction of travel of the upper flight of the conveyor is illustrated in FIGS. 4 and 5 by the arrow 65.

Figure 2:
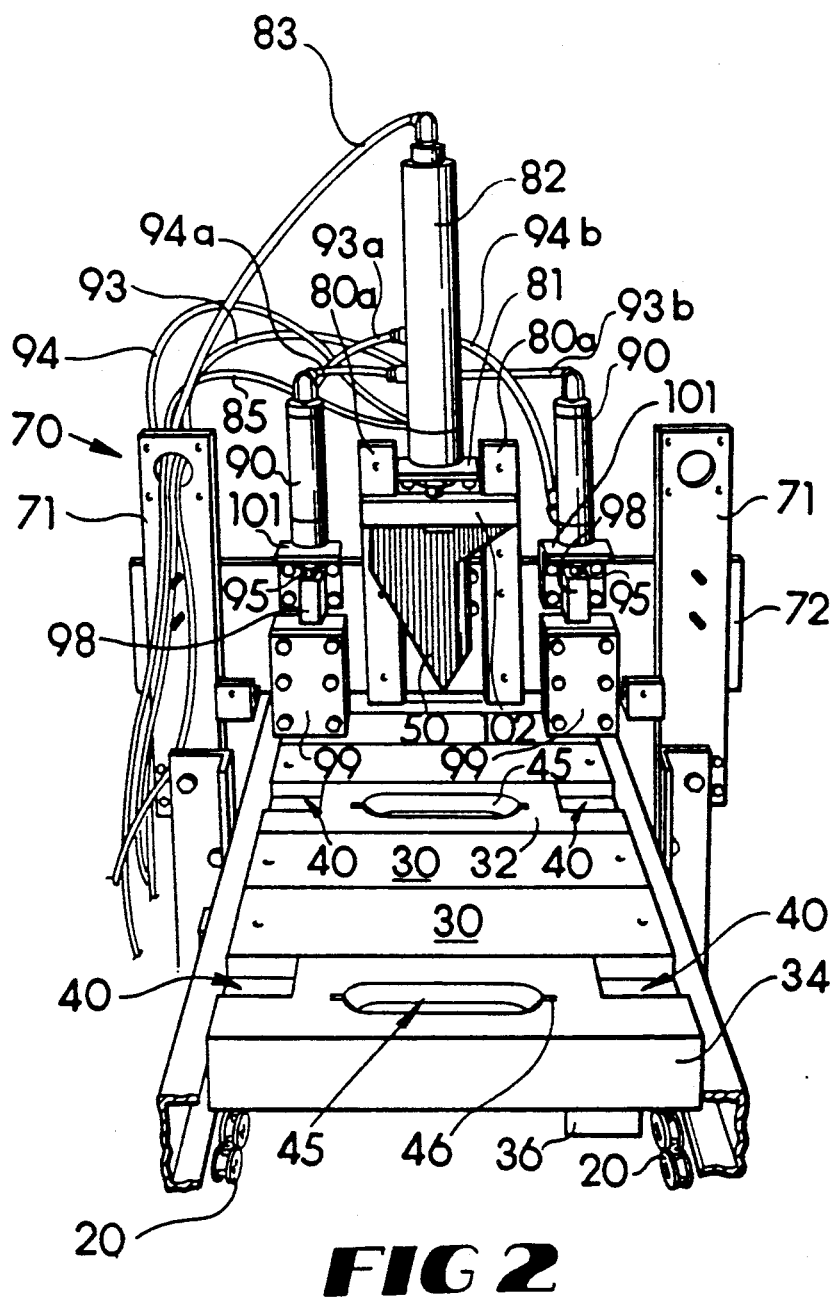
FIG. 2 is an enlarged fragmentary perspective view of a portion of the machine shown in FIG. 1 and showing the knife and fingers of the cutting assembly in their retracted positions.
Figure 3:
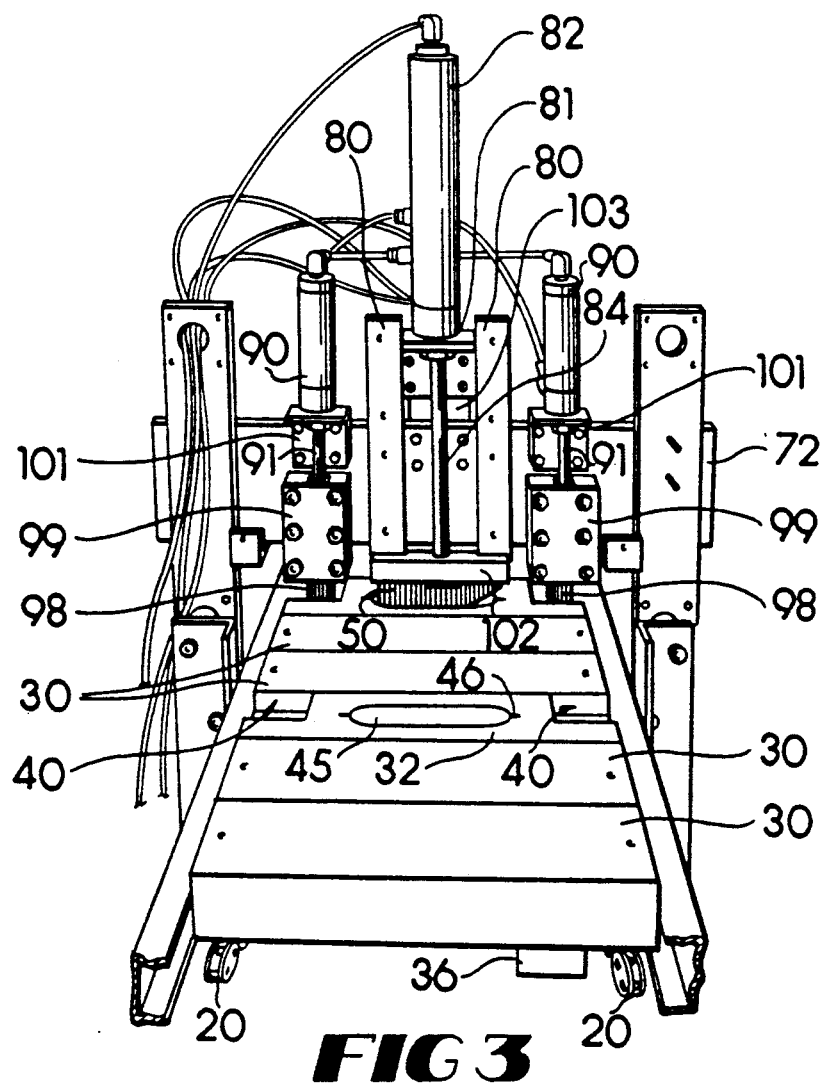
FIG. 3 is a view similar to FIG. 4 but showing the knife and the fingers in their extended positions.

In FIGS. 1, 2, and 3 is shown the traveling knife carriage 5 having an upstanding, movable, cylinder support frame, denoted generally by the numeral 70. As best seen in FIGS. 2 and 3, this cylinder support frame 70 includes a pair of transversely opposed, spaced, upright, support members 71, the intermediate portions of which are joined by a vertically disposed, rectangular, transversely extending, mounting plate 72. The lower end portions of the support members 71 are provided with holes through which the longitudinally disposed upper guide bars, such as upper guide bar or rod 74, respectively protrude. The lower end portions of the support members 71 are respectively secured to and carried by a sliding frame, which includes slide blocks, such as slide blocks 75, seen in FIG. 1 and lower blocks, such as lower slide block 76. Each pair of blocks 75 and 76 are joined by a vertically disposed travel bar 77. The lower slide blocks, such as block 76, slide along lower longitudinally extending rods, such as rod 79.

The ends of the rods 74 and 79 on each side of the rods 14 are supported in U-shaped side frames, such as frame 80, each frame having an upstanding pair of opposed brackets 78 which receive the ends of the parallel rods 74 and 79. The U-shaped frames, such as frame 80, are respectively mounted on the longitudinal rails, such as rail 14, so as to dispose the two rods 74 and 79 in spaced, parallel, longitudinally extending, relationship in their frames 80. Thus, the longitudinally extending rods, such as rods 74 and 79, support the moveable frame 70 for reciprocating longitudinal motion, sliding in prescribed paths rearwardly and forwardly with respect to the upper flight of the conveyor, and supporting the mounting plate 72 disposed over the upper flight of the conveyor. Resilient straps, such as strap 87, yieldably urges the moveable frames 80 forwardly to its normal position shown in FIG. 1.

The mounting plate 72 is provided, in its central portion, with a pair of upstanding, parallel, flat, rectangular, piston supporting brackets 80a which are mounted to plate 72 by their lower ends and extend upwardly above the upper edge of the mounting plate 72. These mounting brackets 80a carry a cylinder mounting plate 81, disposed between the upper end portions of the brackets 80a. A central, pneumatic, double acting, knife actuating cylinder 82 is mounted by its lower end on the plate 81. Air is supplied to the upper end of the cylinder 82 via a line or tube 83. When air under pressure is supplied by line 83 to the top of the piston within the cylinder 82, this air extends the piston rod 84. A second pneumatic line 85 supplies air under pressure to the bottom side of the piston within the cylinder 82 to withdraw or retract the piston rod 84. A valve 86 seen in FIG. 10 controls the supplying of air to this double acting cylinder 82. The traveling knife carriage 5 is covered by a removable cover 7.

On opposite sides of cylinder 82, between the upstanding support members 71 and the upstanding brackets 80 are, respectively, a pair of finger or detent actuating cylinders 90. These cylinders 90 are also double acting Pneumatic cylinders and have piston rods 91 which are extended and retracted at appropriate times. The cylinders 90 always act simultaneously and are controlled from a common control valve 92, air therefrom being supplied to the tops of the pistons, via air line 93 and lines 93a and 93b. Air is supplied to the bottom of the cylinders 90 via air lines 94 and 94a and 94b. Air line 94, however, is connected to position C of a "knot unit" or air manifold 100.

Piston rods 95 of air cylinders 90 are extended when air is supplied via valve 92 to the tops of the pistons and such piston rods 95 are retracted when this air pressure is relieved and on line 93 via valve 92 and air is applied to the lower sides of the pistons of rods 95 from stepping relay 150 via line 161 to position C of manifold 100 and via position C of manifold 100 and through line 94, 94a, and 94b.

The lower ends of the piston rods 95 are connected to slidable rectangular metal bars which are connected to the end of fingers 98. The fingers 98 are respectively slidably journalled for axial movement within journal boxes 99 which are mounted on the front surface of the mounting plate 72. The lower ends of the pneumatic cylinders 90 are mounted by brackets 101 to the upper portion of the mounting plate 72.

Mounted on the protruding lower end of the piston rod 84 is a knife or guillotine supporting bar 102 which extends transversely between and is slidably confined by the arms 80. The quillotine or knife 50 protrudes downwardly from the supporting bar 102 to a point 105 seen in FIG. 7.

A supporting staff 103, seen in FIG. 3, supports the bracket 81 which, in turn, supports the lower end of the cylinder 82. Thus, the upstanding arms 80 and the bracket 81 are supported quite rigidly with respect to the mounting plate 72.

As shown in FIG. 1, the lower flight of the conveyor is covered by a lower U-shaped pan 150 and the front of the conveyor is covered by a concaved shield or cover 151. The shield 151 has side plates, such as plate 152, which fit over the forward edge portions of the main rails 14. The cover 151 may be readily removed along with it sides 152 by simply lifting the cover 151 and pivoting it in a counterclockwise direction about chains 153 which secure the cover to the pan 150. Water introduced through a hose 155 is sprayed against each of the blocks 30 or 32 as the case may be so that these blocks remain in a clean condition during the operation of the machine.

The construction of the knife or guillotine 50 is such that it serves a triple function of simultaneously cutting or splitting a portion of the second joint 60, thereby making a cut through one cartilage while it functions to spread the ulna and radius bones 61 and 62 apart during the single cartilage cut and then continue to spread the two bones 61 and 62 apart to form the V-shape, as illustrated in FIG. 6, the unsevered cartilage joining the two bones 61 and 62 together but being deformed outwardly so that the bones 61 and 62 of the resulting V-shaped product 60 of FIG. 6 is at an obtuse angle of between about 20° and about 90°.

As best seen in FIG. 7, this knife or guillotine 50 is generally triangular and is formed of sheet metal, high carbon steel. The blade 50 is flat and has a straight transverse upper edge portion which is firmly secured to a rectangular, transversely extending, support bar or member 102. The support bar 102 is connected by its central portion to the end of Piston rod 84 so that the blade 50 is quite rigidly held in its plane of travel as the piston rod 84 reciprocates the support member 102. Below the support member 102, the blade has a wide transverse upper area and then tapers inwardly and downwardly. The left side of the knife 50 thus has a straight upper left edge 103, parallel to and offset from piston 84, which terminates in a downwardly and inwardly inclined straight main skin, flesh, and cartilage cutting edge 104. Thus, the material adjacent to the straight inwardly and downwardly inclined cutting edge 104 is bevelled to form that edge 104. The cutting edge 104 is as about 30° to the vertical axis of knife 50 and terminates at a point 105 which forms the apex at the junction of edge 104 and a secondary cutting edge 106. Point 105 is on the vertical axis of piston rod 84 and blade or knife 50.

The secondary cutting edge 106 is opposite to edge 104 and is inclined downwardly and inwardly at an angle of about 30° to the vertical axis. Edge 106 is substantially shorter than the main cutting edge 104. Spaced above the upper end of the secondary cutting edge 106 is an inclined edge 107 of the blade 50. This inclined edge 106, however, is not a cutting edge and is opposite to edge 103. The right upper inclined edge 107 tapers from support member 102, downwardly and inwardly, extending toward the vertical axis of the blade 50 to terminate vertically above the outer end of edge 106. Joining the end portions of edge 107 and edge 106 is a vertically disposed spine 108 which is essentially a cylindrical member, offset from but parallel to the vertical axis of knife 50. The lower end portions of the spine 108 have downwardly converging camming surfaces 109, inclined at the angle of the bevel of cutting edge 106. The lower end portions or surfaces 109 function as camming surfaces to spread, progressively the bones 61 and 62 of the second joint 60 to their V-shape acute angle by acting on the inside surfaces of these bones.

The point 105 is below these camming surfaces and along the axis or vertical center line of knife 50 and piston rod 84, while the spine 108, which extends outwardly on both side surfaces of the blade 50, has a vertical axis or main axis which is parallel to the main axis of the piston 84 but is spaced to the right thereof.

As seen in FIG. 9, the spine 108 protrudes outwardly of the surfaces of the blade 50, the spine 108 being formed of generally half rounded portions which are rigidly mounted to opposite sides of the blade or knife 50, as depicted in FIG. 9. The cutting edge 104 and the cutting edge 106 are bevelled on both sides, as illustrated in FIGS. 7 and 9.

When the blade 50 of FIGS. 7 and 9 is reciprocated, the point 105 initially penetrates the central portion of the transversely disposed second joint 60 and as the blade penetrates further and further downwardly, the main cutting edge 104 progressively cuts outwardly toward the cartilage to be cut, as edge 106 cuts in the opposite direction, thereby enabling edge 104 to eventually sever this one cartilage. After the slice, one bone, the ulna 61, is on one side of blade 50 and the other bone, the radius 62 is on an opposite side. The spine or rounded portion 108, engages the second joint during and after second joint 60 has been cut along the midportion of second joint 60 and applies outward pressure against both of the bones 61 and 62 so that the cartilage is in tension as it is being severed. Thereafter, the continued downward travel of the blade 50 assures that the V-shaped second joint 60, which is thus formed, is urged apart beyond the elastic limits of the second cartilage, so that this cartilage, which is uncut, next is stretched by the outwardly pivotal movement of bones 61 and 62 to such an extent that the two parts do not tend to return to their original positions. Thus, a V-shaped severed second joint 60 is produced, the two portions of the second joint 60 subtending an angle of between 20° and 90°.

When it is desired to cut both cartilages of the second joint, simultaneously, a blade 250, 550 or 650 is substituted for the blade 50. Blade 250 of FIG. 8 is symmetrical about the vertical axis of the piston 84 and includes a wide upper portion which is subtended by opposed, straight, parallel side edges, 203, 203a, these edges merging with downwardly tapered or converging cutting edges 207, 207a which extend downwardly and inwardly to merge with opposed outwardly concaved cutting edges 208, 208a, respectively. These cutting edges 208, 208a curve inwardly and downwardly and then, at their lower portions, protrude outwardly to terminate and merge with the upper end Portions of the tapered downwardly and inwardly extending cutting edges 204, 204a which, in turn terminate in a common point 205. Other essentially diamond shaped blades can be substituted for blade 250.

When the blade or guillotine 250 is reciprocated by the piston 84, it penetrates into the central portion of the second joint 60 and then progressively cuts outwardly in both directions, the concaved edges 208 and 208a almost simultaneously cutting the cartilages at both ends of the bones of the second joint. Further downward movement of the blade 250 assures that the second joint has been split longitudinally throughout its length and severs any residual meat or skin so that two distinct separate parts are produced.

PNEUMATIC SYSTEM

Control valve 37 is mounted in the path of travel of the cam block 36, shown in FIG. 4, so that as the particular transport block 32 approaches the cutting zone of the guillotine 50, the arm of valve 37 is depressed to start a stepping relay 160.

Numerous control valves (not shown) which are transversely spaced across the bottom of the path of travel of the transportation blocks, can be made selectively operable for selected blades or knives for the machine. For example, a second control valve 37a is located in the path of travel and in parallel relationship with control valve 37. Both lead from a source of compressed air to a common multi position (three way) manually operated selector valve 238 by which one control valve or the other is selected to initiate a cycle for the machine. The reason for the plurality of separate control valves 37 and 37a is that different shaped knives, such as those shown in FIGS. 7, 13, 14, 15, and 16, require different transportation blocks, such as those shown in FIGS. 4, 11, 12, 17, 18, 19, and 20, to match the shape of the installed blade. Thus, we position the cam blocks, such as block 36, in different transverse locations for different transportation blocks, to assure that the correct block, such as block 32, is selected for the appropriate knife, such as knife or blade 50. Thus, only if the appropriate block with its correctly positioned cam block, such as cam block 36, is in the machine, and the selector valve 238 is appropriately set for the particular blade, such as blade 50, will air be momentarily supplied to the stepping relay 160 to start its stepping operation.

When the stepping relay 160 is actuated, air is supplied under pressure from a source of air to the relay 160 and thence to tube 171 and tube 161. This first stage of the stepping relay 160 is provided with a timer T which times the delay in providing air to the second stage of the relay. When air is introduced through pipe or tube 171, it travels to valve 92 and then, via line 93, 93a, and 93b, to actuate simultaneously the cylinders 90 and extend the piston rods 95. This, in turn, extends the fingers 98 downwardly to their fullest extent. If one of the spacer blocks is passing beneath the fingers, these fingers 98 simply ride on the surface of the spacer block, until, eventually, they pass into the recesses 40 of a transportation block 32. The fingers then substantially simultaneously drop into the recesses 40 of the transportation block 30 located therebeneath. With progressive movement of the conveyor chains 20, the transportation block 32 continues its rearward travel, thereby engaging the end portions of the extended fingers 98 in the recesses 40 and where they are engaged by abutting the shoulders 44, as shown in FIG. 5. Thus, the fingers 98 act as detents to accurately align the block 32 and knife 50 and to lock the travel of the carriage assembly for movement with the selected block 32. The timer then steps the stepping relay 160 so that second stage is actuated to supply air via tube 172 to valve 68. Thence, air is supplied by tube 83 to the main central cylinder 82, thereby causing it to extend the piston rod 84, urging the guillotine or knife 50, downwardly.

An operator or operators manually load each of the recesses with a second joint 60 in the manner depicted in FIG. 4, the web portion 64 being disposed at the right hand forward corner. The movement of the knife 50 by the piston 84 extends the knife 50 its full travel into the recess 46 for the knife 50 and thereby causes the knife 50 to slice the second joint 60. This slicing is initiated by the point 105 of the blade, as shown in FIG. 7, this point 109 moving progressively downwardly through the central portion of the second joint 60 so as to pass between the two bones 61 and 62. The blade 50 has a V-shaped cutting system consisting of the cutting edges 104 and 106 which when the knife moves progressively downwardly progressively cuts outwardly until the blade 104 severs the outer cartilage and spine 108 spreads the two bones apart.

When the stepping relay trips the third relay stage, air is admitted through tube 173 to the control valve 86. The control valve 86 then supplies air, via tube 85 to retract the main piston and thus retract the knife 50 from its extended position to its retracted position. The control air of tube 153 signals the valve 86 to open the valve 86 to discharge exhaust air coming from tube 83. Thus, the piston 84 is fully retracted.

Next, the stepping relay is tripped to the fourth stage, which introduces control air to tube 174 which leads to valve 92 and controls the valve 92 so as to open the valve to line 93, thereby permitting the air to discharge from line 93. Tube 94 is connected to the third relay of the "knot unit" or manifold 100 actuated by the control air fed from line 161. Thus, when air is supplied by the tubes 93, 93a and 93b to the top of pistons 90 and when the valve 92 is actuated to let in air to tubes 94, 94a, and 94b, these tubes are vented so as to create no appreciable back pressure on the pistons 90. When air is supplied via tube 172, air is also supplied from the second stage of stepping relays 160, via line 162 to actuate the "knot unit" 100 so as to vent line 163 leading from tube 83. Thus, air is vented from the top of the main cylinder 182 via line 83 and line 162 when air through tube 152 is fed to valve 86 to thereby actuate the valve to receive source air from source pipe 164 via valve 86 to tube 83.

When air is supplied to tube 174, air is also supplied to tube 165 to actuate the "knot unit" 100 so as to open tube 166 to ambient air. Thus, when the air of tube 174 actuates valve 86 to introduce air to the cylinders 90, air is vented via line 167 to the ambient air as the valve 86 permits compressed air to pass into line 83 and thence to the top of main cylinder 82.

It is therefore seen that the sequence of events take place in which initially the fingers 98 will be extended so as to be received in the recesses 40. Then, after an appropriate time delay, the guillotine 50 is actuated to extend piston rod 84 and its knife or guillotine 50. After it has travelled fully down, the relay then permits the fingers 90 to be withdrawn and thereafter the piston rod 84 to be withdrawn. Thus, the fingers hold the block 32 in alignment while the knife or guillotine 50 cuts the second joint 60 and all piston rods 95 and 84 are withdrawn to permit the repeat of the next cycle, when the cam block 36 of the next transportation block 32 actuates valve 37 a second time in a subsequent operation.

If desired, the two spacer blocks 30 may be replaced with a single spacer block so that each alternate block is a transportation block 32. This will speed up the machine without increasing the speed of the conveyor. Furthermore, after each cycle, the resilient members 87 return the traveling frame to its original position for a subsequent operation.

During the entire time that the fingers 98 are extended and are received in the recesses 40, the traveling knife carriage 5 travels at the same speed as the conveyor assembly 6; however, when the fingers 98 are retracted, the resilient members 87 return the entire carriage 5 to its original position as shown in FIG. 1.

While we have illustrated a blade 50 in FIGS. 7 and 9 for producing a V-shaped second joint as illustrated in FIG. 6 and that the blade of FIG. 8 can be used for cutting the second joint into two separate pieces, it is believed preferable, however, to employ an angled blade for severing either one or both cartilages, as the case may be. These preferred blades are illustrated in FIGS. 13 through 16.

These improved blades appear to operate better than the blades 50 and 250 depicted in FIGS. 7, 8, and 9 in that they are provided with bent blades having offset portions which enable to the blade to apply lateral force to urge the ulna and radius bones 61 and 62 of the second joint apart, and then cut the cartilage or connective tissue at one or both ends, angularly. The blades of FIGS. 13 through 16 are shaped specifically for cutting only left hand second joints or only right hand second joints, as the case may be.

In the processing of chicken (poultry) it is believed to be an easy matter to accumulate the left second joints and the right second joints in separate containers (not shown). Thus, it is recommended that separate machines 9 be used for processing left hand second joints and right hand second joints so that camming pressure is applied to an intermediate portion of the larger ulna bone and the severing force of the blade is applied angularly to the cartilages at the junctions of the ulna 61 and radius 62. This applies some transverse force to tend to spread the two bones apart before cutting one or both cartilages.

Figure 13:
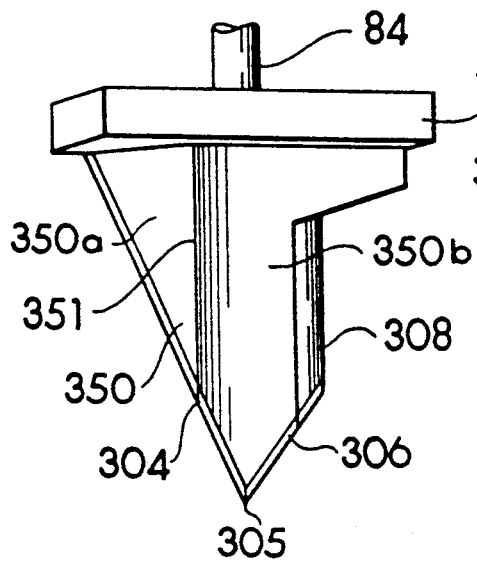
FIG. 13 is a fragmentary, front, elevational view similar to FIG. 7 and showing a modified form of knife which can be substituted for the knife of FIG. 7, this modified knife having a bent blade to enable one cartilage of a right wing of a fowl to be cut at a slight angle.

In FIG. 13 a blade 350 similar to blade 50 is illustrated for cutting a right wing to produce the V-shaped product of FIG. 6. This blade 350 is carried by blade block 302 and is substantially identical to blade 50, having left cutting edge 304, a right cutting edge 306, and a cylindrical spine 308. The difference is that the left portion of the blade 350 is bent rearwardly along a straight, vertical bend 351 to an obtuse angle of from about 150° to about 165° and preferably 160°. The bend 351 forms a camming surface and is spaced to the left of the vertical axis of the blade 350 and is parallel to the cylindrical spine 308 and intersects the cutting edge 304 at an acute angle adjacent but spaced upwardly from point 305. Thus, the bend 351 should terminate and intersect edge 304 at about the same depth as the tip of the spine 308 intersects edge 306.

Figure 14:
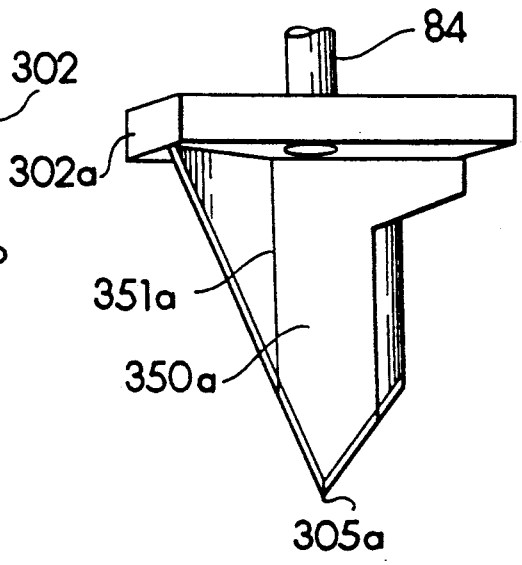
FIG. 14 is a front elevational view of a modified knife similar to the knife of FIG. 13 but for cutting the left wing of a fowl.

If left second joints are to be processed, blade or knife 351a of FIG. 14 should be used in which the bend 351a of blade 350a should be forwardly in the opposite direction from bend 351 of FIG. 13 as illustrated in FIG. 14. The blades 350 and 350a are for Producing products similar to the second joint 60 of FIG. 6.

Figure 15:
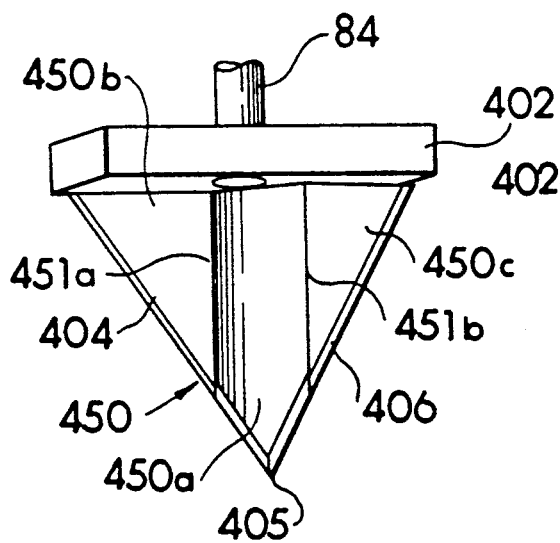
FIG. 15 is a front elevational view of still another modified knife for use in cutting both cartilages of the right wing of a fowl.
Figure 16:
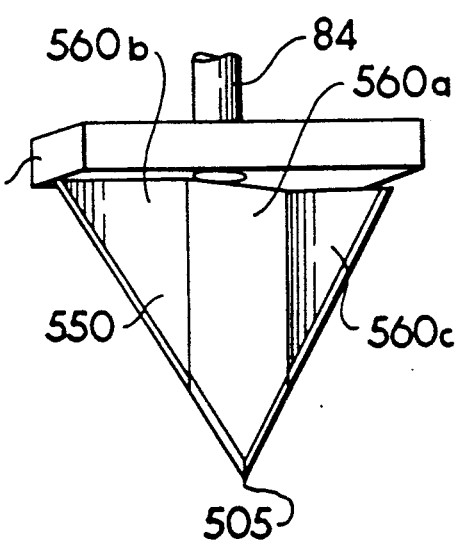
FIG. 16 is a front elevational view similar to FIG. 15 but showing a knife for cutting both cartilages of the left wing of a fowl.

When producing a complete slice through the second joint, including cutting both cartilages, it is preferable to use the blade shown in FIG. 15 for cutting the left second joint and the blade 550 of FIG. 16 for the right second joint. The blade 450 of FIG. 15 is a symmetrical blade having opposed downwardly tapered cutting edges 404 and 406 which taper to a point 405 forming the apex of edges 404 and 406. Blade 450 is an integral member initially flat but provided with two parallel vertical bends 451a and 451b on opposite sides of the longitudinal axis of the blade 450 to define a flat central panel 450a and a pair of angling flat wing panels 450b and 450c. Panel 450a and panel 450b have a common edge or camming surface 451a formed along a convex portion of a vertical bend. Panel 450a and panel 450c are joined along the other common vertical bend 451b which forms a second, vertical camming surface parallel to bend 451a. The panels 450a, 450b, and 450c are about of equal width. The distance between the parallel camming surfaces 451a and 451b is less than the distance between the cartilages which join the ends of the ulna and radius bones 61 and 62 so that both cartilages are under tension.

Blade 450 in FIG. 15 is bent about axis 451a to the left and then bent about axis 451b to the right so that panels 450c and 450b are parallel to each other but offset to the left. The blade 450 thus has convex camming surfaces along axes 451a and 451b for acting against the ulna and radius bones 61 and 62 of the left second joint for simultaneously urging portions of the second joint apart after the flat tip end portion of knife 450 cuts into the second joint and between the bones 61 and 62 thereof. The angle between the planes of panels 450a and 450b and between panel 450c and 450b should both be between about 150° and about 165° and preferably 160°. After the initial cut of the flesh across the second joint 60, the blade 450 has penetrated below the lower ends of axes 451a and 451b and thus the upper portions of edges 404 and 406 begin to cut angularly to sever, simultaneously both cartilages of the second joint, each edge 404 and 406 cutting the cartilages at an angle.

For a right second joint the knife 550 should be shaped identical to knife 450 except that panels 560b and 560c should be parallel and offset to the right from each other, as shown in FIG. 16, panels 460b and 460c being joined along the common edges at axes 461a and 461b and the angle between adjacent panels again being from about 150° to about 165° and preferably 160°. This blade 550 thus cuts in the same way as described for blade 450.

Figure 11:
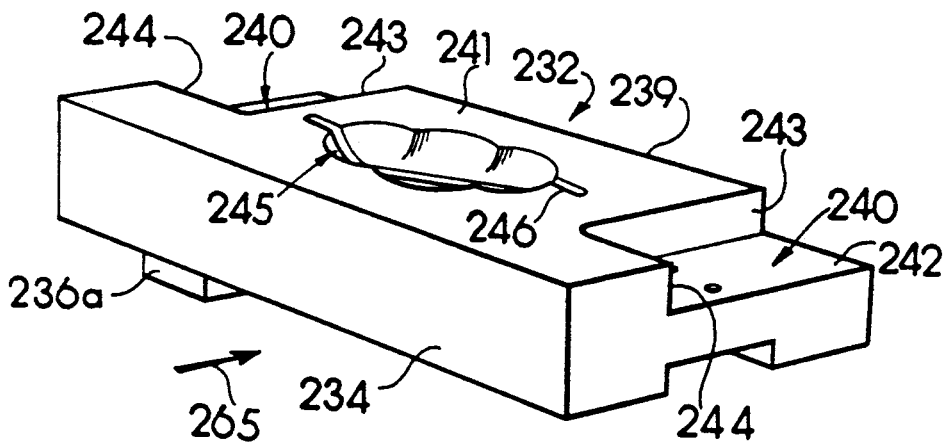
FIG. 11 is a perspective view of a modified transportation block suitable for use with the knife of FIG. 8.

Each of the blades 13 through 16 must have a transportation block which is shaped to receive the particular blade with which the block is to cooperate. Thus, in FIGS. 11, 12, 17, 18, 19, and 20, the specific blocks are shown which cooperate with the specific blades. In FIG. 11 is illustrated a block 232 which cooperates with the blade 250 of FIG. 8. The block 232 includes a rear wall 234, a cam block 36a, a front edge 239, a pair of transversely opposed recesses 240 in the upper surface 241 of block 232. The recesses 240 are defined by upper recess surface 242, side surfaces 243, transversely aligned shoulders 244, and the second joint receiving cavity 245. The slot 246 is straight and transverse, extending across the central portion of the recess 245. With the exception of this straight, transverse slot 246 and the camming member or block 36a, the transportation block 232 of FIG. 11 is identical to the transportation block 32 of FIG. 4 and 5. It will be remembered that the blocks, such as block 232 as distinguished by the machine from the block 32 by the transverse location of the camming block 36a and the transverse location of the camming block 36. The block 232 illustrated in FIG. 3 is adapted to being moved by the conveyor in the direction of the arrow 265.

Figure 12:
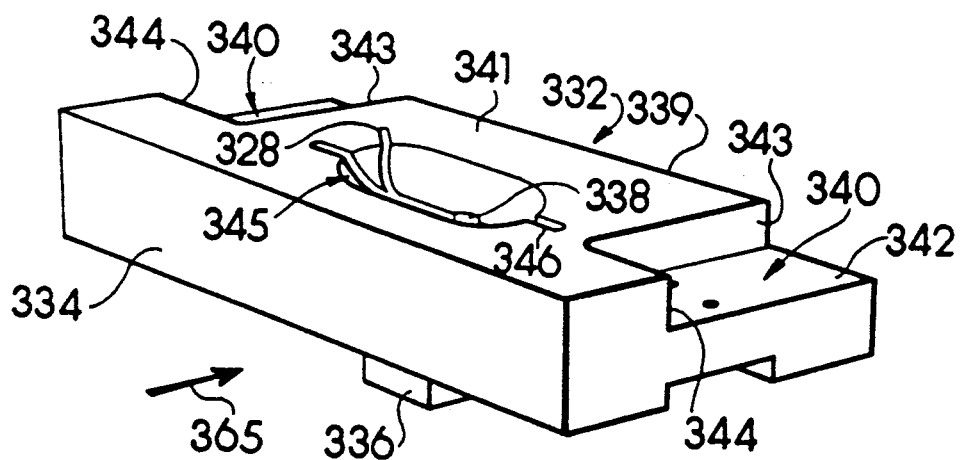
FIG. 12 is a perspective view of another modified form of a transportation block which is suitable for use with either the knife of FIG. 7 or the knife of FIG. 13.

The transportation block 332 of FIG. 12 is adapted for cooperation with the blade 50 of FIG. 7 or the blade 350 of FIG. 13. This block 332 is identical to block 32 except for the blade receiving slot arrangement. Thus, the block 332 has a rear wall 334, a camming block or cam block 336, a front edge 339, a pair of opposed recesses 340 in the upper surface 341 of block 332, an upper surface 342 for each recess, a side surface or wall 343 for each recess, and a pair of transversely disposed shoulders 344, and a second joint receiving cavity 345. The slot 346 is a straight slot identical to the slot 46, except that the slot has a branch slot 338 which is disposed at an angle to the transverse vertical plane of the slot 345. The angle of the branch slot 328 with respect to the slot 346 is equal to the angles subtended by the panels 350a and 350b so that the transportation block 32 can cooperate with either the blade 50 or the blade 350. Both blade 50 and 350 have the spine 108 or 308, as the case may be and there is a circular, enlarged opening 338 along the vertical slot 346 so as to permit the spines 108 and 308 to pass along the enlarged portion 338.

In FIG. 17, the block 332a is specifically designed to cooperate with the blade 350 of FIG. 13. There, the block is identical to block 32 except that the slot 346a is provided at one end portion with an angled leg 328a which extends diagonally from slot 346a. The slot 346a and leg 328a conform to the cross-section of the blade 350 of FIG. 13 and is adapted to cooperate therewith.

In FIG. 18, the block 332b is identical to block 32 except that it has a leg 328b which angles in the opposite direction from the angling of slot leg 328a and is therefore adapted to cooperate specifically with the knife 350a of FIG. 14.

In the same fashion, the block 432 is identical to the block 32 except that its second joint receiving recess 445 is arranged at an angle and is produced from overlapping concaved portions to form the angling recess 445. Here, the slot 446 has two straight, parallel, transverse end portions and a central slot portion which joins the two end portions. Here, the slot 446 corresponds to the cross-section of the blade 450 so as to cooperate with that blade when that blade is used. In like fashion, the transportation block 532 is provided with an angled recess 545 which corresponds to recess 445 except that it angles in an opposite diagonal direction. In like fashion the slot which extends through the central portion of the recess 545 is provided with two angles so as to conform to the cross-section of the knife 550 of FIG. 16. Thus, when the knife of FIG. 16 is used, the block 532 should be used.

Since the machine appears to runs best when there is a space equal to one block 30 or 32 between adjacent blocks 32, a machine can be arranged with a transportation block 332 which will cooperate with one type of knife 350, alternated with a transportation block 432 to cooperate with the other type of knife 450. Each type of block would have its own camming member, such as member 236 to actuate an appropriately located air control valve 237. When valve 37 is to control the air for the system, the three-way selector valve 238 would manually be aligned with line 239 and the line from valve 37. When valve 237 is to control the three-way valve 238 would be manually aligned with the line from control valve 237 and line 239. Valve 27 is in the path of travel and is actuated by cam 36 of block 32 and valve 237 is actuated by and is in the path of travel from cam 236 of block 232.

Thus, when blade 50 is used the valve 37 should be actuated by cam 36 where when blade 450 is to be used, valve 437 should be actuated by cam 436 for operation.

Hence, on a single lane machine which has alternate transportation blocks 32 and 432, for example, in place of any spacer blocks, such as blocks 30, the appropriate turning of the handle of valve 238 will select the transportation block 32 or 432 which should be used for the appropriate blade installed in the machine.

A test machine has indicated that about 72 second joints per minute may be readily processed with a machine of the present invention.

It will be obvious to those skilled in the art that many variations may be made in the embodiment here chosen for the purpose of illustrating the present invention, without departing from the scope thereof as defined by the appended claims.

We claim:

1. A machine for cutting a second joint of a poultry wing, said second joint having spaced ulna and radius bones, the ends of which are joined by cartilages and flesh around to said bones, comprising:
   means defining a cutting zone;
   a cutting element disposed adjacent to said cutting zone;
   conveyor means for supporting said second joint in a transverse position and for moving said second joint sidewise along a longitudinal path of travel to and from said cutting zone;

said cutting element having a generally flat transversely disposed knife disposed generally perpendicular to said longitudinal path;

means for aligning said knife with said second joint; and operating means for moving said knife toward said cutting zone while said knife is aligned with said second joint to urge said knife progressively into and through said flesh, between said spaced bones and through at least one of said cartilages, said actuating means thereafter returning said knife to its position adjacent to said cutting zone.

2. The machine defined in claim 1 wherein said knife has a pointed end and a cutting edge inclined with respect to the path of travel of said said knife, said knife being moved by said actuating means in a path so that the point of said knife enters a central portion of said second joint and said cutting edge progressively cuts said second joint in a lateral direction away form the point of entry of the point of said knife into said second joint and thence through the cartilage at one end portion of said second joint.

3. The machine defined in claim 2 wherein said knife has camming elements which urge said bones apart during the travel of said knife along its path of travel.

4. The machine defined in claim 2 wherein said knife is deformed transversely to provide an camming surface which will progressively pass along one bone of said second joint as said knife is cutting a cartilage of said second joint.

5. The machine defined in claim 1 wherein said conveyor means includes a flexible endless conveyor having an upper flight for receiving successive second joints and lower flight, and means for moving said endless conveyor along a prescribed path of travel for passing the upper flight of said conveyor through said cutting zone.

6. The machine defined in claim 6 wherein said cutting means is a reciprocatable knife arranged transversely of said prescribed path of travel.

7. A machine for cutting a second joint of a poultry wing, said second joint having spaced ulna and radius bones, the ends of which are joined by cartilages and flesh around to said bones, comprising:

means defining a cutting zone;

a cutting element disposed adjacent a cutting zone;

conveyor means for moving said second joint to and from said cutting zone;

operating means for moving said cutting element along a prescribed path of travel toward said cutting zone to urge said cutting element progressively into and through said flesh, between said spaced bones and through at least one of said cartilages, said actuating means thereafter returning said cutting element to its position adjacent to said cutting zone;

said conveyor means includes a flexible endless conveyor having an upper flight for receiving successive second joints and lower flight, means for moving said endless conveyor along a prescribed path of travel for passing the upper flight of said conveyor through said cutting zone;

said cutting means being a reciprocatable knife arranged transversely of said prescribed path of travel; and means for moving said cutting element along a second path of travel of said upper flight as said cutting element is moved in its path of travel toward and away from said cutting zone.

8. The machine defined in claim 1, wherein said conveyor means includes an endless conveyor having a generally horizontal upper flight, said conveyor having a transportation means thereon provided within recess for receiving said second joint oriented in a prescribed position with respect to said upper flight.

9. The machine defined in claim 8 wherein said recess is elongated transversely of the path of travel of said conveyor for orienting said second joint in a position transversely of the direction of movement of said upper flight, and said cutting element is a knife reciprocated toward and away from said transportation means when said block is in said cutting zone.

10. A machine for cutting a second joint of a poultry wing, said second joint having spaced ulna and radius bones, the ends of which are joined by cartilages and flesh around to said bones, comprising:

means defining a cutting zone;

a cutting element disposed adjacent to said cutting zone;

conveyor means for supporting said second joint to and from said cutting zone;

operating means for moving said cutting element along a prescribed path of travel toward said cutting zone to urge said cutting element progressively into and through said flesh, between said spaced bones and through at least one of said cartilages, said actuating means thereafter returning said cutting element to its position adjacent to said cutting zone; and a frame for supporting said knife in its position adjacent to said cutting zone and means for moving said knife along the path of travel of said upper conveyor as said knife cuts said second joint.

11. The machine defined in claim 10 wherein said means for moving said frame includes a detent on said frame and means for engaging said detent with said block during cutting action of said knife.

12. The machine defined in claim 11 wherein said detent on said frame includes a movable finger, means for automatically moving said finger toward and away from said conveyor means, said conveyor means having a recess which receives said finger when said finger is extended and means for moving said finger toward and away from the path of travel of said conveyor means.

13. The machine defined in claim 12 including a cam on said conveyor for actuating said means for moving said finger.

14. The machine defined in claim 1 wherein said conveyor means includes and endless conveyor having an upper flight for carrying successive second joints along said upper flight, means for orienting said second joints in transversely disposed relationship to the path of travel of said upper flight, said cutting means including a reciprocatable pointed knife and said operating means includes means for reciprocating said pointed knife for successively cutting said second joints when each of said second joints is disposed in said cutting zone and means for moving said knife at the speed of said conveyor as said knife is reciprocated.

15. A machine for cutting an object comprising:

a main frame;

a conveyor mounted on said main frame; said conveyor having an upper flight and a lower flight, a transportation block carried on said conveyor for movement along a prescribed path, said block having a recess in its upper surface for receiving and retaining an object to be cut, means for driving said conveyor for moving said transportation block along its prescribed path;

a support means on said main frame adjacent to the path of travel of said block; and cutting means on said support means for cutting said object.

16. The machine defined in claim 15 wherein said cutting means includes a V-shaped knife having downwardly and inwardly inclined cutting edges and a point forming the apex of said edges and means for reciprocating said knife toward and away from said objects as each of said objects passes adjacent to said knife.

17. The machine defined in claim 16 including means on said support means for synchronizing the movement of support means with the travel of said conveyor.

18. The machine defined in claim 17 including additional transversely disposed transportation blocks on said conveyor for receiving and supporting successive of said objects disposed transversely on said blocks and said blade being disposed transversely of the path of travel of said upper flight.

19. A machine for cutting the second joint of poultry wings comprising, a conveyor for conveying successive of said second joints along a prescribed path, a pointed knife disposed adjacent to said conveyor for being urged into cutting action with respect to said second joints as they are passed adjacent to said blade by said conveyor, and camming means for cooperating with said blade for urging the bones of said second joint apart as a cartilage joining the end portions of said bone is being cut.

20. The machine defined in claim 19 wherein said cutting element is a reciprocatable blade, and said camming means is a camming surface on said blade inwardly of its cutting edge.

21. The machine defined in claim 19 wherein said blade is deformed and said camming means is the deformed portion of said blade.

22. The machine defined in claim 19 wherein said blade is reciprocated and including a straight surface on said blade parallel to the path of reciprocation of said blade.

23. Process for cutting the second joints of wings of poultry comprising:

arranging said second joints in spaced parallel relationship to each other;

moving said second joints in their spaced relationship along a path of travel generally perpendicular to the parallel arrangement of said second joints and toward and into a cutting zone;

arranging, adjacent to said cutting zone, a pointed knife having a cutting edge with the point and edge projecting toward said path of travel of said second joints; and reciprocating said blade toward and away from said path of travel while moving said blade along said path of travel in synchronization with the movement of said second joints along said path of travel whereby the point of said blade protrudes into and cuts each second joint between the two adjacent bones of each second joint and also separates a cartilage which joins the two bones at one end of the second joint.

24. Process of producing poultry products from second joints of the poultry, each second joint having a radius bone and ulna bone joined at their ends by cartilages, comprising the steps of:

successively severing the second joint at one cartilage and lengthwise between the radius and ulna bones thereof; and successively urging the radius bone and ulna bone of each second joint outwardly away from each other to pivot these bones about the uncut cartilage so as to bias the uncut cartilage beyond its elastic limits and so that the second joint forms and remains in a V-shape.

25. The process defined in claim 24 including applying a coating to said product.

26. The process defined in claim 25 including cooking said product.

27. Process of severing or partially severing second joints of a poultry wing comprising:

moving successive second joints of poultry wings along a predetermined path with each second joint being disposed sidewise and the ulna bone of each second joint oriented in the same direction; and reciprocating a cutting element for successively cutting said second joint along the middle portion of each second joint between the ulna and radius bones.

28. In a process of preparing the second joint of a wing of a chicken, the steps of cutting the second joint longitudinally between the ulna and radius bones, separating the juncture of said bones at one end and moving the bones outwardly from each other pivoting them about the other end of said second joint, the movement being sufficient for the ulna and radius bones to remain in an outwardly deformed angular position with respect to each other.

29. A blade for reciprocation to automatically cut successive second joints longitudinally between the ulna and radius bones, beginning from a position inwardly of the two cartilages which join the ulna and radius bones cutting outwardly between the two bones and thence through one cartilage joining the ends of bones and for thereafter urging the bones away from each other comprising:

a generally flat blade body having a point at one end and tapered cutting edges converging toward said point, said blade body also having along its surface and inwardly of its point, a camming surface for urging said bones apart after said point has penetrated the central portion of said second joint to apply a separating force on the ulna and radius bones as the cartilage is cut.

30. The blade defined in claim 28 wherein said blade is adapted to be reciprocated along a path of travel toward and away from said second joint with the point pointing toward said second joint and wherein said camming surface is generally parallel to the path of travel of said blade.

31. The blade defined in claim 28 wherein said camming surface is a spine parallel to said path of travel of said blade, said spine protruding outwardly from a side of said blade.

32. The blade defined in claim 28 wherein said camming is formed by a bend in said blade extending parallel to the Path of travel of said blade.

33. The blade defined in claim 28 wherein said camming surface includes two spaced parallel bent portions of said blade.

34. The blade defined in claim 28 wherein said camming surface comprises two transversely spaced parallel longitudinal bends in opposite directions for separating said blade into a central panel containing the point and two wing panels outwardly of said central panel, said wing panels being parallel to each other.

35. A poultry product comprising, a raw second joint of a wing of a fowl in which the flesh of the second joint has been separated into two parts along all but one end portion of the flesh on the second joint and the separated portions of the flesh respectively remain joined to the ulna and radius bones of the second joint, said ulna and radius bones remaining joined to each other only at said one end portion, said ulna and radius bones being deformed outwardly from each other about said one end portion and the ulna and radius bones having been urged away from each other to form a permanently deformed V-shaped member.

36. The poultry product defined in claim 35 including a coating material covering substantially the entire exposed portions of the flesh of said second joint.

37. The poultry product of claim 35 in which said product is cooked and a cooked coating over said second joint.

* * * * *